(No Model.)

H. HEARD.
BUSH BOX FOR SPINDLES.

No. 269,854. Patented Jan. 2, 1883.

Attest:
Courtney A. Cooper
H. E. Hansmann

Inventor:
Henry Heard
By his attorney
Charles E. Foster

United States Patent Office.

HENRY HEARD, OF GREENSBOROUGH, GEORGIA.

BUSH-BOX FOR SPINDLES.

SPECIFICATION forming part of Letters Patent No. 269,854, dated January 2, 1883.

Application filed June 6, 1882. (No model.)

*To all whom it may concern:*

Be it known that I, HENRY HEARD, a citizen of the United States, and a resident of Greensborough, Greene county, Georgia, have invented an Improved Bush-Box for Spindles, of which the following is a specification.

My invention is a bush-bearing for shafts or spindles, constructed as fully described hereinafter, to center and support the spindle, prevent straining and undue wear of the parts, secure a thorough lubrication, and reduce friction.

Figure 1:
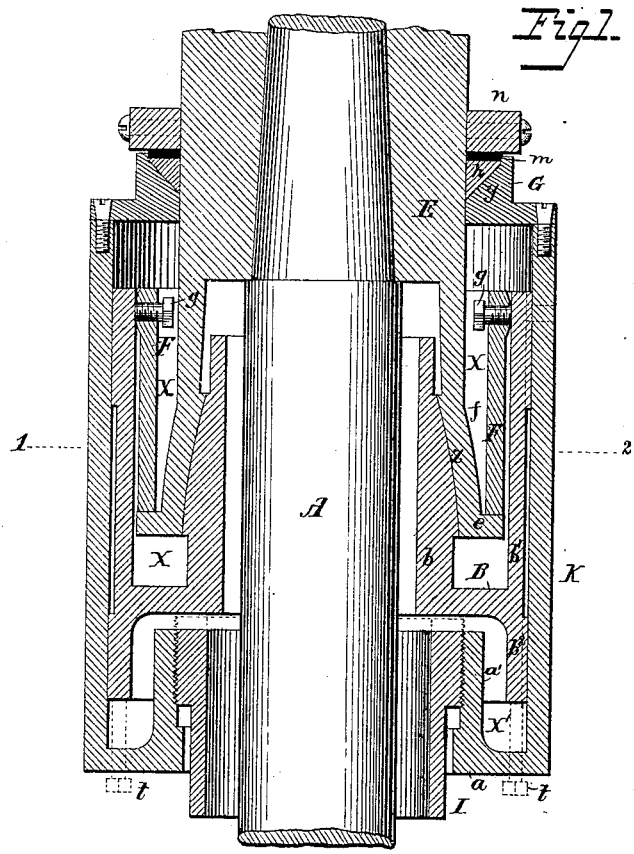
Figure 2:
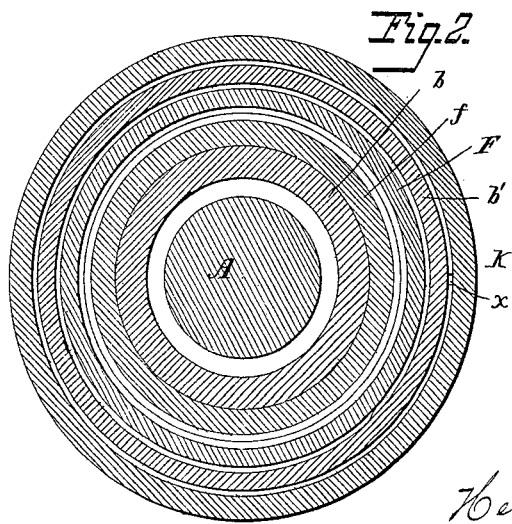

In the drawings, Figure 1 is a sectional elevation showing a shaft and bearing. The shaft may be that of a millstone or of any other machine or apparatus; and Fig. 2 is a cross-section on the line 1 2, Fig. 1.

K is a cylindrical case or box, suitably supported according to the apparatus in which it is used, and having an annular bottom, $a$, and inside vertical flange, $a'$, threaded to carry an adjusting-sleeve, I, for the purpose hereinafter described.

B is an inner casing or bushing having two parallel sides or walls, $b$ $b'$, inclosing an oil-chamber, X, and a flange, $b^2$, extending downward as a prolongation of the outer wall, $b'$, into an oil-chamber, $X'$, inclosed between the side of the case K and its flange $a'$. In the outer wall, $b'$, of the bushing is a vertical slot, $x$, which receives a pin or feather on the casing K, so that the bushing can rise and fall freely in the casing without turning. The wall $b$ of the bushing has a conical outer face adapted to the corresponding face, $z$, of a collar, $f$, projecting downward from a sleeve, E, which is bolted firmly to the spindle, these coinciding conical faces being the bearing-faces, which are always submerged in the oil filling the chamber X in the bushing. A flange, $e$, extends from the collar $f$, and a ring or sleeve, F, is firmly secured by set-screws $g$ within the bushing and with its lower end upon the flange $e$, and thereby prevents the bearing-face of the collar $f$ from rising from the face of the bushing when the sleeve E is caused to follow the vertical movements of the spindle to which it is attached.

By screwing up the adjusting-sleeve I to the position shown in dotted lines, Fig. 1, the bushing may be held in position until the ring F is secured in place. The sleeve I is then lowered.

Set-screws $t$ (shown in dotted lines, Fig. 1,) may be substituted for the ring I.

The collar $f$ and wall $b$ may occupy reversed positions, the sleeve lying within the wall $b$.

To exclude the dust, an annular cap, G, is bolted to the top of the casing K, and has a beveled edge, $v$, to receive a beveled-edged ring, $h$, which fits close to the sleeve E, and a packing, $m$, of leather or other suitable material, is placed between the ring and a ring, $n$, bolted to the sleeve E.

The bearing-faces, which may be of any desired form, may be recessed to receive an anti-friction facing of any suitable character.

The conical bearing insures an absolute centering of the shaft A, and prevents any lateral play and irregular wear of the bearing-faces. These faces are prevented from becoming separated, and consequently from wearing irregularly, should the shaft expand longitudinally or rise from its step, by the bearing of the flange $e$ upon the ring F, which, as described, would result in the lifting of the box B without any separation of the bearing-faces.

I claim—

1. In a bush-bearing, the combination of the box K, the bushing B, sliding in the box and provided with an outer conical bearing-face contracted toward the top, and the sleeve E, secured to the spindle, having a collar, $f$, outside the bushing bearing-face coinciding with that of the bushing B, as set forth.

2. The combination of the box K, bushing B, having a bearing-face, sleeve E, secured to the spindle and provided with a collar, $f$, and flange $e$, and ring F, secured within the bushing, substantially as set forth.

3. The combination, with the casing, ring F, sleeve E, having a flange, $e$, and bushing, of an adjusting-sleeve, I, for temporarily holding the bushing, substantially as set forth.

In testimony whereof I have signed my name to this specification in the presence of two subscribing witnesses.

HENRY HEARD.

Witnesses:
W. B. JACKSON,
L. SCHEVENELL.